United States Patent [19]

Hsu

[11] Patent Number: 5,128,061
[45] Date of Patent: Jul. 7, 1992

[54] PHENYL-PYRIMIDINE LIQUID CRYSTAL MATERIALS

[75] Inventor: Ying-yen Hsu, Los Altos, Calif.

[73] Assignee: Optical Shields, Inc., Menlo Park, Calif.

[21] Appl. No.: 567,268

[22] Filed: Aug. 14, 1990

[51] Int. Cl.$^5$ .................. C09K 19/34; C09K 19/52; C07D 239/02; G02F 1/13
[52] U.S. Cl. .................. 252/299.61; 252/299.01; 544/298; 544/315; 544/316; 544/318; 359/104
[58] Field of Search .............. 252/299.61; 350/350 S; 544/298, 315, 316, 318; 568/23, 25

[56] References Cited

U.S. PATENT DOCUMENTS

| | | | |
|---|---|---|---|
| 4,256,656 | 3/1981 | Beguin et al. | 260/465 D |
| 4,366,330 | 12/1982 | Gray et al. | 568/775 |
| 4,621,901 | 11/1986 | Petrzilka et al. | 350/350 S |
| 4,686,289 | 8/1987 | Huynh-Ba et al. | 544/224 |
| 4,709,030 | 11/1987 | Petrzilka et al. | 544/242 |
| 4,713,197 | 12/1987 | Eidenschink et al. | 252/299.61 |
| 4,737,311 | 4/1988 | Scheuble et al. | 252/299.61 |
| 4,753,752 | 6/1988 | Raynes et al. | 252/299.65 |
| 4,769,176 | 9/1988 | Bradshaw et al. | 252/299.65 |
| 4,776,973 | 10/1988 | Bofinger et al. | 252/299.61 |
| 4,816,178 | 3/1989 | Katagiri et al. | 252/299.6 |
| 4,820,839 | 4/1989 | Krause et al. | 544/316 |
| 4,834,904 | 5/1989 | Krause et al. | 252/299.01 |
| 4,855,429 | 8/1989 | Heppke et al. | 544/335 |
| 4,874,545 | 10/1989 | Heppke et al. | 252/299.61 |
| 4,876,027 | 10/1989 | Yoshinaga et al. | 252/299.65 |
| 4,882,082 | 11/1989 | Eidenschink et al. | 252/299.61 |
| 4,886,622 | 12/1989 | Miyazawa et al. | 252/299.61 |
| 4,892,676 | 1/1990 | Sakurai et al. | 252/299.61 |
| 4,906,402 | 3/1990 | Jackson et al. | 252/299.6 S |
| 4,943,385 | 7/1990 | Inoue et al. | 252/299.61 |
| 5,002,694 | 3/1991 | Wachtler et al. | 252/299.61 |
| 5,064,566 | 11/1991 | Hopf et al. | 252/299.61 |

FOREIGN PATENT DOCUMENTS

| | | | |
|---|---|---|---|
| 0318423 | 9/1989 | European Pat. Off. | 544/298 |
| 3305013 | 9/1983 | Fed. Rep. of Germany . | |
| 3709549 | 10/1988 | Fed. Rep. of Germany . | |
| 3709618 | 10/1988 | Fed. Rep. of Germany . | |
| 3733818 | 4/1989 | Fed. Rep. of Germany . | |
| 145913 | 1/1981 | German Democratic Rep. . | |
| 244342A1 | 4/1987 | German Democratic Rep. . | |

OTHER PUBLICATIONS

Matsumoto et al., "Molecular Orientation of Liquid Crystals by Organic Metal Complexes", Journal de Physique, C3-4(40) (1979) pp. C3-510 et seq.
Demus et al., "Liquid Crystal Tables II" Leipzig, (1984) pp. 39 et seq.
Sharma et al., "Binary Liquid Crystal Systems With Two Eutectics", Mol. Cryst. Liq. Cryst., vol. 51, (1978) pp. 225 et seq.
Frederic J. Kahn et al., "A Paperless Plotter Display System Using a Laser Smectic Liquid-Crystal Light Valve", SID 87 Digest, 1987.
Rotz et al., "Kristallin-flussige polymere Phenylaza-azobenzenverbindungen", Z. Chem., vol. 27(8), (1987) pp. 293 et seq.
Kahn, "Orientation of liquid crystals by surface coupling agents", App. Phys. Lett., vol. 22, No. 8 (1973) pp. 386 et seq.
Gray et al., "Mesomorphic Transition Temperatures for the Homologous Series of 4-n-Alkyl-4'-Cyanotolanes and Other Related Compounds", Mol. Cyst. Liq. Cryst., vol. 37 (1976) pp. 213 et seq.
Zaschke, "Liquid crystalline 2-cyanopyrimidinnes", Z. Chem., vol. 17(2) (1977) pp. 63 et seq.
Zaschke et al., "Synthesis of low-melting point, liquid–crystal heterocycles", Z. Chem., vol. 17(8), (1977) pp. 293 et seq.
Hiltrop et al., "Alignment of Liquid Crystals by Amphiphilic Monolayers", Ber. Bunsenges Phys. Chem., vol. 82, (1978) pp. 884 et seq.
S. Matsumoto et al., "Large-Area Video-Rate Multicolor Ferroelectric Liquid-Crystal Display", SID 88 Digest, (1988) pp. 41-44.
D. Walba et al., "Design and Synthesis of a New Ferroelectric Liquid Crystal Family. Liquid Crystals Containing a Nonracemic 2-Alkoxy-1-propoxy Unit", J. Amer. Chem Soc., vol. 108, (1986) pp. 5210-5213.

Primary Examiner—Richard D. Lovering
Assistant Examiner—Cynthia Harris
Attorney, Agent, or Firm—Renner, Otto, Boisselle & Sklar

[57] ABSTRACT

Substituted-hydrocarbylthio phenyl-pyrimidines are disclosed which exhibit smectic A phases over a wide temperature range and are useful in formulating smectic A compositions. The liquid-crystal compositions formulated utilizing the smectic A compounds of the present invention have particular application in smectic cells such as laser smectic liquid-crystal light valves and optical limiters used in high performance environments.

16 Claims, No Drawings

PHENYL-PYRIMIDINE LIQUID CRYSTAL MATERIALS

TECHNICAL FIELD

The invention described herein is directed to compounds having liquid-crystal properties, to liquid-crystal compositions containing such compounds and to their application in various devices. More particularly, the present invention pertains to phenyl-pyrimidine compounds which exhibit smectic liquid-crystal phases. The compounds have particular application as constituents for liquid-crystal phases used in smectic cells such as laser smectic liquid-crystal light valves and optical limiters.

BACKGROUND OF THE INVENTION

Liquid-crystals are highly anisotropic fluids that exist between the boundaries of the solid and ordinary (i.e., isotropic) liquid phase. The phase is a result of long-range orientational ordering among molecules that occurs within certain ranges of temperatures. The ordering is sufficient to impart some solid like properties on the fluid, but the ordering is usually not strong enough to prevent flow. This dualism of physical properties is expressed in the term liquid-crystal.

Liquid-crystals may be divided into two broad categories according to the principle means of breaking down the complete order of the solid state: (1) Lyotropic liquid-crystals, which are multicomponent mixtures, result from the action of a solvent, and (2) Thermotropic liquid-crystals, which also may be mixtures of compounds, result from the melting of mesogenic solids and, hence, are thermally activated mesophases.

Within each category, three distinctive structural classes of liquid-crystals have been identified. These structures are related to the dimensionality and packing aspects of the residual molecular order.

(1) The nematic phase is the simplest: there is a preferred direction (referred to as the director) for the long axis, but the spatial distribution of the molecules is random, as in an ordinary liquid.

(2) The cholesteric phase is locally nematic in structure, but on a macroscopic scale a "twist" or helical structure is introduced such that the preferred direction rotates right or left as one proceeds along the optical axis.

(3) The smectic phase also has a preferred direction for the long axis, but an additional degree of order is introduced in that the molecules are spatially arranged in parallel layers. The smectic liquid-crystals are distinguished not only by a parallelism of the molecular long axes, but by a layering of the molecular centers of gravity in two-dimensional planes or sheets.

Smectic A phases are the least ordered of all the smectic structures. The molecules are arranged in equally spaced layers and, thus, define a definite repeat distance which may be measured by X-ray diffraction methods. In the smectic A phase, the long axes of the molecules generally are perpendicular to the layer plane. Within each layer, the centers of gravity are randomly dispersed and there is considerable freedom of translational motion and rotation, but the long axes are relatively unrestricted. In other words, the motion within the dimensions of the layer plane is free like a liquid, but in the direction out of the plane it is highly restricted almost like a solid.

The high degree of order found in smectic phases is useful for constructing thick liquid-crystal cells with a high degree of clarity. Even a perfectly formed thin (hundreds of microns) nematic cell would be turbid and scatter light strongly because of thermal fluctuations in molecular orientation. In the smectic phase, however, the orderly layered structure effectively results in a "molecular vice" which firmly clamps all the molecules into place, reducing the directional fluctuations that single molecules can undergo.

Recently, optically clear liquid-crystal cells which are up to one millimeter thick have been proposed using smectic A phase liquid-crystals. This would not be feasible using nematic or smectic C phase liquid-crystals, since thermal oscillations of the defined direction or "director" cause significant light scattering. However, smectic A can be ordered in thick layers since the director lies perpendicular to layers which contain the molecular centers. These materials show a sensitive nonlinear optical response to Q-switched laser pulses of various wave lengths which indicates that they will be useful in applications including optical limiters against Q-switched laser pulses and display systems using laser smectic liquid-crystal light valves.

Practical applications of thick smectic films require liquid crystalline materials which have a wide smectic A temperature range, narrow nematic range, sharp phase transition temperature, photo stability toward laser and solar radiation, and a low response threshold for power limiting.

Unfortunately, commercially available smectic A compounds and compositions contain certain drawbacks. Specifically, the smectic A temperature ranges for these compounds are from a lower limit of about 0°-16° C. to a upper limit of about 40°-59° C. Under severe environmental conditions requiring high performance, a smectic A liquid-crystal composition having a wider temperature range is desirable.

Thus, there continues to be a need for smectic A liquid-crystal compositions for high-performance applications requiring thermal and chemical stability in combination with a high response speed.

SUMMARY OF THE INVENTION

The present invention addresses the above-noted and other drawbacks by providing certain phenyl-pyrimidine derivatives which exhibit useful smectic A phases. The present invention is based upon the discovery that certain hydrocarbylthio-substituted phenyl-pyrimidines exhibit smectic A phases over a wide temperature range and are useful in formulating smectic A compositions. The liquid-crystal compositions formulated utilizing the smectic A compounds of the present invention have particular application in smectic cells such as laser smectic liquid-crystal light valves and optical limiters used in high performance environments.

DETAILED DESCRIPTION

The invention pertains to compounds of the following formula (I):

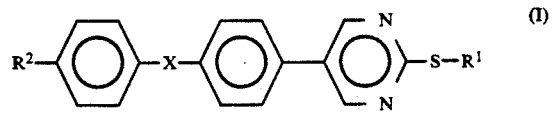

wherein R¹ is linear or branched alkyl or alkenyl, or is aryl; R² is linear or branched alkyl, alkenyl, alkoxy, alkylcarbonyl, alkoxycarbonyl or alkylcarbonyloxy, or is aryl, halo or cyano; and X is a central linkage selected from —CH=NH—, alkylene, alkenylene, alkynylene,

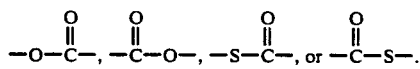

In one embodiment, group R¹ is selected from linear or branched alkyl having 1 to about 16 carbon atoms, or linear or branched alkenyl having 2 to about 16 carbon atoms; and R² is selected from linear or branched alkyl or alkoxy, each alkyl or alkoxy group having 1 to about 16 carbon atoms, or is linear or branched alkenyl having 2 to about 16 carbon atoms. The alkylene, alkenylene, and alkynylene linking groups may have various carbon atom chain lengths and they may be straight or branched. Ethylene, ethenylene, and ethynylene linking groups are generally convenient from the standpoint of performance of the formula (I) compound as a liquid crystal and ease of synthesis.

In another embodiment, the invention pertains to compounds of the following formula (II):

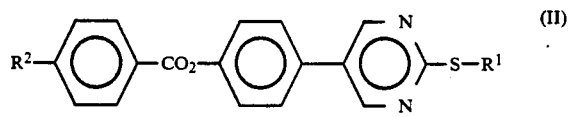

wherein R¹ is selected from linear or branched alkyl having 1 to about 16 carbon atoms, or linear or branched alkenyl having 2 to about 16 carbon atoms; and R² is selected from linear or branched alkyl or alkoxy, each alkyl or alkoxy group having 1 to about 16 carbon atoms, or is linear or branched alkenyl having 2 to about 16 carbon atoms.

The phenyl-pyrimidine compounds of this invention represented by the above formulae I and II form smectic A phases and are useful as constituents in smectic A liquid-crystal compositions. The compounds of the present invention typically exhibit smectic A phases within a temperature range of about 75° C. to about 165° C.

Some of the compounds represented by the above formulae I and II of which R¹ or R² are branched may contain one or more chiral carbon atoms. These optically active compounds will exhibit ferroelectric properties and may be used in applications requiring ferroelectric optical switching.

One or more of the compounds of the present invention can be used as components to formulate smectic A mixtures with components such as phenyl thiopyrimidine, phenyl pyrimidine, biphenyl, biphenyl pyrimidine, terphenyl, and ester type liquid crystal materials. Examples of these liquid crystal materials are disclosed in Demus et al, *Flussige Kristalle in Tabellen II (Liquid Crystal Tables II)*, (Leipzig 1984), which is hereby fully incorporated herein by reference. Specific examples of useful phenyl thiopyrimidines are described in Zaschke et al, *Z. Chem.*, Vol. 17, pp. 293 et seq (1977); phenyl pyrimidine type components are described in Boller et al, *Mol. Cryst. Liq. Cryst.*, Vol. 42, pp. 1225 et seq (1977) and Villiger et al, *Z. Naturforsch.*, Vol. 34b, pp. 1535 et seq (1979); biphenyls are specifically described in Gray et al, *Electron Lett.*, Vol. 9, pp. 130 et seq (1973), Hirata et al, *Mol. Cryst. Liq. Cryst.*, Vol. 20, pp. 334 et seq (1973) and Huhne et al, *J. Chem. Soc., Chem. Commun.*, pp. 98 et seq (1974); terphenyls are specifically described in U.S. Pat. No. 4,228,030 and Gray et al, *J. Chem. Soc., Chem. Commun.*, pp. 431 et seq (1974); and ester type liquid crystal materials are described in detail in Deutcher et al, *Z. Chem.*, Vol. 17, pp. 64 et seq (1977) and in West German Laid-Open Patent Application No. 2,415,929. Each of the aforementioned references is hereby fully incorporated herein by reference for their disclosure relating to the preparation and use of the aforementioned specific types of liquid crystal materials.

Among the phenyl thiopyrimidines-type liquid crystal materials, the 2-alkylthio-5-(4-substituted-phenyl)-pyrimidine compounds may be mentioned, particularly those in which the substituent in the 4-position of the phenyl group is an alkyl, alkoxy, or alkylthio group; useful phenyl pyrimidines include 5-n-alkyl-2-(4-cyanophenyl)- and 5-(trans-4-n-alkylcyclohexyl)-2-(4-cyanophenyl)-pyrimidine compounds; useful examples of biphenyls include 4-n-alkyl-4'-cyano-biphenyl compounds; useful terphenyl examples include 4-alkyl-4'-cyano-p-terphenyl compounds; and useful examples of ester-type liquid crystal materials include 4-cyanophenyl-trans-4-n-alkylcyclohexane carboxylates and 4-cyanophenyl-4-substituted benzoates in which the substituent in the 4-position of the 4-cyanophenyl benzoates may, for example, be an alkyl, alkoxy or alkylthio group.

Advantageously, materials such as nematic mixtures, for example ROTN 605 TM (a nematic mixture of ester type, biphenyl type and phenyl pyrimidine type liquid crystal components having a melting point of less than −20° C. and a clearing point of 98° C. commercially available from Hoffmann-La Roche Corp., Liquid Crystals Division), and dopants may also be used to prepare smectic A phases with the compounds of the present invention.

The compounds of formulae I and II can be derived as follows:

Some of the intermediate compounds are obtained by reacting an alkylhalide compound with a thiourea in a polar solvent under reflux to yield a compound represented by the Formula (A):

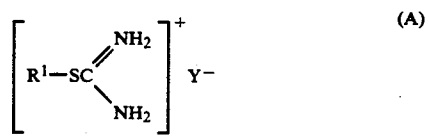

where R¹ is as defined in formula (I) above and Y is a halogen atom.

Other intermediate compounds are obtained by reacting a compound represented by the Formula (B):

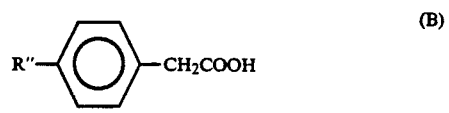

with dimethylformamide in the presence of HClO₄ and POCl₃ to yield a compound represented by the Formula (C):

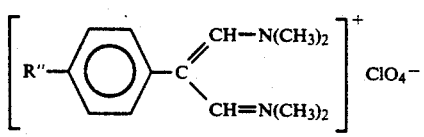 (C)

where the moiety R" depends upon the central linkage X desired in Formula (I) above. For example, when X is —CO$_2$— or —COS—, then R" would be —OH or —SH respectively.

The compounds (A) and (B) are reacted in a polar solvent under reflux, cooled and acidified to yield a compound represented by the Formula (D):

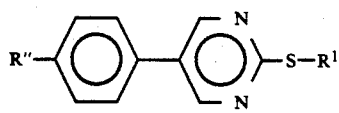 (D)

Phenyl-pyrimidine compounds of the present invention where central linkage X is —CO$_2$— or —COS— are obtained by reacting a compound represented by the Formula (E):

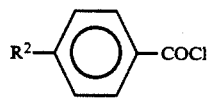 (E)

with a compound of Formula (D) wherein R" is —OH or —SH, in the presence of triethylamine at room temperature.

Phenyl-pyrimidine compounds of the present invention where central linkage group X is a reverse ester or thioester are obtained by reacting a compound represented by Formula (F):

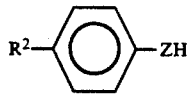 (F)

where Z is O or S, with a compound of Formula (D) wherein R" is a carbonylhalide to yield the respective reverse ester and thioester.

Some of the phenyl-pyrimidine compounds of the present invention where central linkage X is a Schiff base (—CH=NH—) are obtained by reacting a compound represented by the Formula (G):

 (G)

with a compound of Formula (D) wherein R" is —NH$_2$.

Other phenyl-pyrimidine compounds of the present invention where central linkage X is a hydrocarbylene such as alkylene, alkenylene or alkynylene are obtained by reaction of a compound represented by the Formula (H):

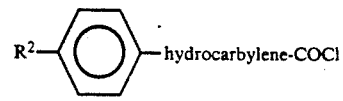 (H)

with a compound of Formula (D) wherein R" is H and subsequent reduction to yield the desired compounds. Any known technology for providing aromatic ring substitution, such as Friedel-Crafts acylation and subsequent Wolff-Kischner reduction on the carbonyl group may be employed to obtain the desired final products.

To prepare the present compounds with two-carbon hydrocarbonyl central linkages, for example, the suitable procedures are described in Gray et al., "Mesomorphic Transition Temperature for the Homologous Series of 4-n-Alkyl-4'-Cyanotolanes and Other Related Compounds", MOL. CRYST. LIQ. CRYST., Vol. 37, pp. 213-231 (1976), which is hereby fully incorporated herein by reference. The general reaction scheme is shown below:

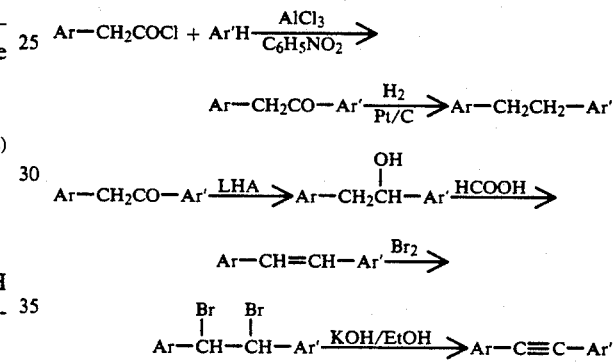

The phenyl-pyrimidine compounds of this invention have a smectic A phase over a wide temperature range of from about 75° C. to about 165° C. Thus, the compounds of the present invention can be used as components to formulate smectic A mixtures with other suitable liquid-crystal materials to raise the upper limit of the smectic A phase temperature range.

Compositions including the compounds of the present invention can be used to formulate smectic A mixtures for thick transparent smectic cells using known methods including those set forth in Hiltrop et al, "Alignment of Liquid Crystals by Amphiphilic Monolayers", BER. BUNSENGES. PHYS. CHEM., Vol. 82, pp. 884-889 (1978), which is hereby fully incorporated herein by reference.

In general, there are two types of cells: one in which the molecules are perpendicular to the surfaces of the cell (end-on geometry), and the other having molecules that lie parallel to the cell walls (bookshelf geometry). The inner surface of the cells is treated to promote the desired type of alignment. For end-on cells, the surface is treated with a layer of lecithin, DMOAP (N,N-dimethyl-N-octadecyl-3-aminopropyltrimethoxysilyl chloride), or myristatocarboxylatochromium complex to minimize the attraction of liquid-crystal molecules to the surface. Bookshelf cells, on the other hand, require a strong attraction to the surface so that the molecules lie flat on the surface as much as possible. Prior to assembly, the inner surfaces for bookshelf cells are coated with a layer of PVA (polyvinyl alcohol) or PI (polyimide) and then rubbed with a linen cloth in a single direction in order to cause the surface layer of molecules to all lie in the desired direction. The assembled cells are filled with a composition comprising liquid-crystal components and other additives, heated up into the isotropic liquid range, and allowed to cool and form the smectic phase.

Surface treatments alone generally suffice for construction of thin (tens of microns) liquid-crystal cells, but thick cells (on the order of 0.5-1.0 mm) require additional methods to promote good alignment in the bulk material far removed from the enclosing surfaces. On method which has been used successfully employs AC or DC electric fields for this purpose. Due to their anisotropic susceptibility, the liquid-crystal molecules experience a torque which tends to make the long axis parallel to the electric field. By suitable placement of electrodes, an electric field can promote alignment far from the surfaces. The field only needs to be applied while the liquid-crystal is cooling down from the isotropic liquid to the nematic phase and the alignment is being established. Once the smectic phase is formed, the applied voltage is removed and the cell will be stable indefinitely if reasonable care is taken to avoid strong vibration or stress. The end-on cells need a field established between the glass surfaces, so a transparent conductive coating such as indium tin oxide (ITO) is applied to the glass. The ITO coating tends to reduce the clarity and power-handling capability of the cell. No ITO coating is required for the bookshelf cells since a field parallel to the glass surfaces is used in this case. Metal spacers which set the cell thickness do double duty as electrodes in the bookshelf cells.

In this regard, the compounds of the present invention will have particular application in preparing very high order retardation plates. Retardation plates, or phase shifters, including quarter-wave, half-wave, and full-wave plates, are elements primarily used in the synthesis and analysis of light in various states of polarization. The quarter-wave plate is especially useful, finding application in the construction of isolaters used in laser-interferometry, in multistage traveling-wave laser amplifiers (to prevent the stages from behaving as oscillators), and in electro-optic modulators.

The simplest retardation plate is a slice cut out of a uniaxial crystal such that the slice contains the crystalline optic axis direction. The velocity difference between the ordinary (O) and extraordinary (E) beams within the plate, resulting from an unpolarized beam of light which is normally incident upon it, is therefore maximized. As the O and E beams traverse the plate, a phase difference accumulates between these beams which is proportional to the distance traveled within the plate. At emergence the O and E beams recombine to form a second unpolarized beam.

If the thickness of the plate is such that the phase difference (retardation of the slow ray by comparison with the fast ray at emergence) is ¼-wavelength, the plate is called a first-order quarter-wave plate. If the phase difference at emergence is ½-wavelength, the plate is called a first-order half-wave plate. If the phase difference at emergence is some multiple of ¼- or ½-wavelength, the plate is called a multi-order or higher-order plate. The inventor notes that it is this phase difference, and not the physical thickness of the plate, that these names refer to. Mica and quartz are usually used to make retardation plates, and the actual thickness of even a first-order ¼-wave is a large number of wavelengths. Compared to optically active quartz, a liquid-crystal cell can easily have sixty times greater retardation on a equal thickness basis. A thick smectic cell can give an enormous phase shift between ordinary and extraordinary light rays. Liquid-crystals are also among the few materials which are transparent and birefringent in the near infrared spectrum range.

In addition, the compounds of the present invention have equal application in devices such as laser smectic liquid-crystal light valves, smectic liquid-crystal cells for laser modulators and laser-addressed liquid-crystal light valve projection displays.

In order that those skilled in the art will be better able to practice the invention, the following examples are given by way of illustration and not by way of limitation. Unless otherwise noted, all temperatures are set forth in degrees Celsius.

EXAMPLE 1

1. S-n-Hexylisothiourea.hydrobromide ($R^1=C_6H_{13}$)

A mixture of n-hexylbromide (57.75 g, 0.35 m) and thiourea (26.6 g, 0.35 m) in 95% ethanol (175 ml) is heated under reflux in a water bath for four hours. The ethanol is removed by evaporation and ether is added. The resulting reaction mixture is cooled in a refrigerator. The precipitate is filtered and purified by washing with ether to yield intermediate product (1) (51.7 g, 60.3%), mp 83.5°-84.5° C.

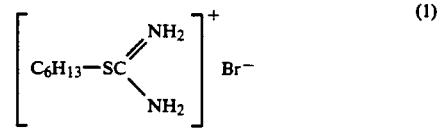

2. 1-Dimethylamino-3-dimethylimino-2-(4-hydroxyphenyl)-propene-(1)-perchlorate

Phosphoryl chloride (13.5 ml, 0.15 m) is slowly added dropwise into absolute DMF (18.25 g, 0.25 m) under cooling and stirring. The solution is cooled to $-10°$ C., thereafter, 4-hydroxyphenyl acetic acid (8.2 g, 0.054 m) is added in small portions. The reaction mixture is stirred at room temperature for one hour, then at 60° C. for two hours, and finally at 80° C. for five hours. After distilling off the excess solvent under vacuum on a water bath, the remaining syrup is carefully decomposed in a beaker with water (10 ml) under cooling. After cooling to $-10°$ C., 70% perchloric acid (15 ml) and ether (200 ml) is added. After cooling in a freezer overnight, the formed precipitate is suction-filtered, washed with ether and recrystallized from methanol/ether to yield intermediate product (2) (14, 9 g, 86.7%) mp >220° C.

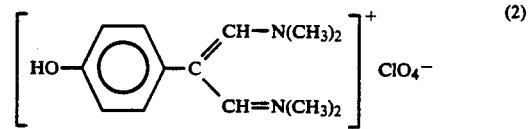

3. 2-n-Hexylthio-5-(4-hydroxyphenyl) pyrimidine ($R^1=C_6H_{13}$)

A mixture of 1-dimethylamino-3-dimethylimino-2-(4-hydroxyphenyl)-propene-(1)-perchlorate (7.95 g, 0.025 m) and S-n-hexylisothiourea.HBr (6.025 g, 0.025 m) is warmed in an absolute pyridine (40 ml) under refluxing at 80° C. for six hours. Thereafter, the cooled reaction mixture is poured onto ice/conc H₂SO₄ (270 g/34 ml). The precipitate is filtered and recrystallized from methanol several times to yield intermediate product (3). (4.7 g, 65.2%) mp 94.7° C.

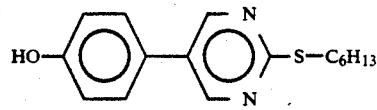

4. 4-(2-n-Hexylthiopyrimidyl)phenyl-4'-n-pentylbenzoate (R²=C₅H₁₁; R¹=C₆H₁₃)

4-n-pentylbenzoyl chloride (1.05 g, 0.005 m) is added dropwise to a mixture of 2-n-hexylthio-5-(4-hydroxyphenyl)pyrimidine (1.44 g, 0.005 m) and triethylamine (0.56 g, 0.0055 m) in methylene chloride (15 ml) and stirred at room temperature for two hours. The precipitated salt is filtered off and washed with methylene chloride. The filtrate is washed with diluted sodium hydroxide solution and water until neutral to the litmus paper. The solvent is removed by evaporation and the residue is crystallized from ethanol (4X) to yield the desired final product (4) (1.8 g, 77.92%). K-S$_A$: 77.1°; S$_A$-I: 158.6°.

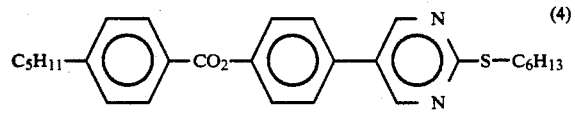

EXAMPLES 2-14

The following compounds are prepared analogously by substituting the respective R¹ and R² groups shown below for the R¹ and R² groups of Example No. 1:

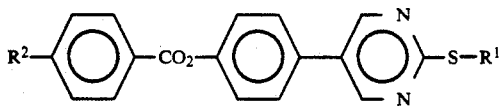

| Example No. | R² | R¹ | Trans. Temp. °C. |
|---|---|---|---|
| 2 | C₃H₇ | C₈H₁₇ | K-84.3-S$_A$-158.8-I |
| 3 | C₄H₉ | C₅H₁₁ | K-99.5-S$_A$-155.2-I |
| 4 | C₄H₉ | C₈H₁₇ | K-72.2-S$_A$-152.6-I |
| 5 | C₅H₁₁ | C₅H₁₁ | K-83.2-S$_A$-159.1-I |
| 6 | C₅H₁₁ | C₈H₁₇ | K-66.2-K₁-72.5-S$_A$-156.4-I |
| 7 | C₅H₁₁O | C₅H₁₁ | K-87.1-S₁-94.3-S$_A$-181.2-I |
| 8 | C₇H₁₅ | C₅H₁₁ | K-92-S$_A$-157.3-I |
| 9 | C₇H₁₅ | C₆H₁₃ | K-86.7-S$_A$-156.4-I |
| 10 | C₇H₁₅ | C₈H₁₇ | K-87.8-S$_A$-154-I |
| 11 | C₈H₁₇ | C₅H₁₁ | K-90.3-S$_A$-155.7-I |
| 12 | C₈H₁₇O | C₅H₁₁ | K-81-S$_A$-180.1-I |
| 13 | C₈H₁₇O | C₈H₁₇ | K-95.1-S$_A$-172.6-I |
| 14 | C₁₀H₂₁ | C₅H₁₁ | K-75.8-S$_A$-152.7-I |

K and K₁ = crystal; S$_A$ and S₁ = smectic phase; I = isotropic

The following examples relate to liquid-crystal phases according to the invention:

EXAMPLE A

A smectic A liquid-crystal phase is prepared from:

| Component | Wt. % |
|---|---|
| 4-(2-n-octylthiopyrimidyl)phenyl-4'-n-butylbenzoate | 9.5 |
| 2-n-pentylthio-5-(4-n-hexyloxyphenyl)pyrimidine | 32.0 |
| ROTN 605 (K-<-20-N-98-I) | 58.5 |

This mixture has a phase transition of K-<-15-SA-64.5-N-77.5-I.

The smectic A phase is stable indefinitely at 0° C. and also stable at −15° C. for at least three months.

EXAMPLE B

A smectic A liquid-crystal phase is prepared from:

| Component | Wt. % |
|---|---|
| 4-(2-n-octylthiopyrimidyl)phenyl-4'-n-pentylbenzoate | 11 |
| 2-n-pentylthio-5-(4-n-hexyloxyphenyl)pyrimidine | 29 |
| ROTN 605 | 60 |

This mixture shows a phase transition of K-<0-SA-64.1-N-79.4-I.

The smectic A phase is stable indefinitely at 0° C., but is stable at −15° C. for only three days.

EXAMPLE C

A smectic A liquid-crystal phase is prepared from:

| Component | Wt. % |
|---|---|
| 4-(2-n-octylthiopyrimidyl)phenyl-4'-n-butylbenzoate | 8.9 |
| 4-(2-n-octylthiopyrimidine)phenyl-4'-n-pentylbenzoate | 17.7 |
| 4-cyano-4'-n-octylbiphenyl | 22.7 |
| ROTN 605 | 50.7 |

This mixture exhibits a phase transition of K-15-SA-64-N-90.5-I.

The smectic A phase is stable at 0° C. for only two days, but is stable indefinitely at 15° C.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A compound of the formula:

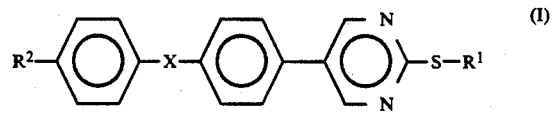

wherein R¹ is linear or branched alkyl or alkenyl, or is aryl; R² is linear or branched alkyl, alkenyl, alkoxy, alkylcarbonyl, alkoxycarbonyl or alkylcarbonyloxy, or is aryl, halo or cyano; and X is a central linkage selected from the group consisting of —CH=NH—, alkylene, alkenylene,

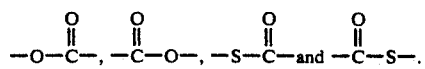

2. A compound of claim 1 having formula (II):

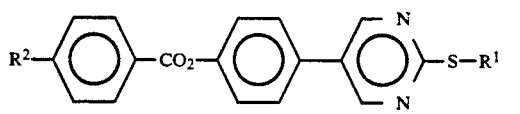

wherein R¹ and R² are as defined in claim 1.

3. A compound of claim 2, wherein R¹ is linear or branched alkyl of 1 to about 16 carbon atoms; and R² is linear or branched alkyl or alkoxy, each alkyl or alkoxy group having 1 to about 16 carbon atoms.

4. The compound of claim 2 which is:
4-(2-n-hexylthiopyrimidyl)phenyl-4'-n-pentylbenzoate;
4-(2-n-octylthiopyrimidyl)phenyl-4'-n-propylbenzoate;
4-(2-n-pentylthiopyrimidyl)phenyl-4'-n-butylbenzoate;
4-(2-n-octylthiopyrimidyl)phenyl-4'-n-butylbenzoate;
4-(2-n-pentylthiopyrimidyl)phenyl-4'-n-pentylbenzoate;
4-(2-n-octylthiopyrimidyl)phenyl-4'-n-pentylbenzoate;
4-(2-n-pentylthiopyrimidyl)phenyl-4'-n-pentoxybenzoate;
4-(2-n-pentylthiopyrimidyl)phenyl-4'-n-heptylbenzoate;
4-(2-n-hexylthiopyrimidyl)phenyl-4'-n-heptylbenzoate;
4-(2-n-octylthiopyrimidyl)phenyl-4'-n-heptylbenzoate;
4-(2-n-pentylthiopyrimidyl)phenyl-4'-n-octylbenzoate;
4-(2-n-pentylthiopyrimidyl)phenyl-4'-n-octyloxybenzoate;
4-(2-n-octylthiopyrimidyl)phenyl-4'-n-octyloxybenzoate; or
4-(2-n-pentylthiopyrimidyl)phenyl-4'-n-decylbenzoate.

5. A smectic A liquid-crystal composition comprising at least one compound represented by the following formula (I):

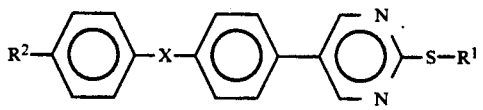

wherein R¹ is linear or branched alkyl or alkenyl, or is aryl; R² is linear or branched alkyl, alkenyl, alkoxy, alkylcarbonyl, alkoxycarbonyl or alkylcarbonyloxy, or is aryl, halo or cyano; and X is a central linkage selected from the group consisting of —CH=NH—, alkylene, alkenylene, alkynylene,

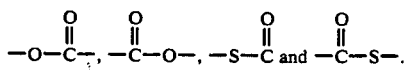

6. The composition of claim 5 comprising at least one compound represented by the following formula (II):

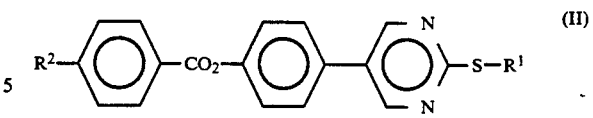

wherein R¹ and R² are as defined in claim 5.

7. The composition of claim 6, wherein R¹ is linear or branched alkyl of 1 to about 16 carbon atoms; and R² is linear or branched alkyl or alkoxy, each alkyl or alkoxy group having 1 to about 16 carbon atoms.

8. The composition of claim 6 comprising at least one compound selected from the group consisting of:
4-(2-n-hexylthiopyrimidyl)phenyl-4'-n-pentylbenzoate;
4-(2-n-octylthiopyrimidyl)phenyl-4'-n-propylbenzoate;
4-(2-n-pentylthiopyrimidyl)phenyl-4'-n-butylbenzoate;
4-(2-n-octylthiopyrimidyl)phenyl-4'-n-butylbenzoate;
4-(2-n-pentylthiopyrimidyl)phenyl-4'-n-pentylbenzoate;
4-(2-n-octylthiopyrimidyl)phenyl-4'-n-pentylbenzoate;
4-(2-n-pentylthiopyrimidyl)phenyl-4'-n-pentoxybenzoate;
4-(2-n-pentylthiopyrimidyl)phenyl-4'-n-heptylbenzoate;
4-(2-n-hexylthiopyrimidyl)phenyl-4'-n-heptylbenzoate;
4-(2-n-octylthiopyrimidyl)phenyl-4'-n-heptylbenzoate;
4-(2-n-pentylthiopyrimidyl)phenyl-4'-n-octylbenzoate;
4-(2-n-pentylthiopyrimidyl)phenyl-4'-n-octyloxybenzoate;
4-(2-n-octylthiopyrimidyl)phenyl-4'-n-octyloxybenzoate; and
4-(2-n-pentylthiopyrimidyl)phenyl-4'-n-decylbenzoate.

9. The composition of claim 5 further comprising a second phenyl thiopyrimidine type liquid crystal material or a phenyl pyrimidine, biphenyl, biphenyl pyrimidine, terphenyl, or ester type liquid crystal material.

10. The composition of claim 9 wherein the composition comprises a nematic mixture of ester type, biphenyl type and phenyl pyrimidine type liquid crystal components.

11. A smectic cell containing a liquid crystal composition comprising at least one compound represented by the following formula (I):

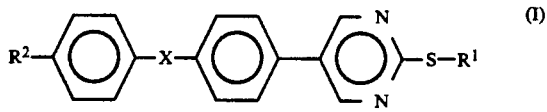

wherein R¹ is linear or branched alkyl or alkenyl, or is aryl; R² is linear or branched alkyl, alkenyl, alkoxy, alkylcarbonyl, alkoxycarbonyl or alkylcarbonyloxy, or is aryl, halo or cyano; and X is a central linkage selected from the group consisting of —CH=NH—, alkylene, alkenylene, alkynylene,

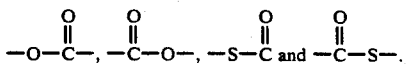

12. The smectic cell of claim 11 wherein said liquid crystal composition comprises at least one compound of the following formula (II):

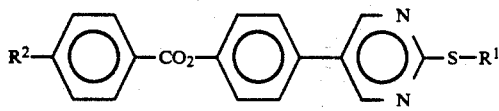

wherein $R^1$ and $R^2$ are as defined in claim 11.

13. The smectic cell of claim 12, wherein $R^1$ is linear or branched alkyl of 1 to about 16 carbon atoms and $R^2$ is linear or branched alkyl or alkoxy, each having 1 to about 16 carbon atoms.

14. The smectic cell of claim 12 wherein said liquid-crystal composition comprises at least one compound selected from the group consisting of:
4-(2-n-hexylthiopyrimidyl)phenyl-4'-n-pentylbenzoate;
4-(2-n-octylthiopyrimidyl)phenyl-4'-n-propylbenzoate;
4-(2-n-pentylthiopyrimidyl)phenyl-4'-n-butylbenzoate;
4-(2-n-octylthiopyrimidyl)phenyl-4'-n-butylbenzoate;
4-(2-n-pentylthiopyrimidyl)phenyl-4'-n-pentylbenzoate;
4-(2-n-octylthiopyrimidyl)phenyl-4'-n-pentylbenzoate;
4-(2-n-pentylthiopyrimidyl)phenyl-4'-n-pentoxybenzoate;
4-(2-n-pentylthiopyrimidyl)phenyl-4'-n-heptylbenzoate;
4-(2-n-hexylthiopyrimidyl)phenyl-4'-n-heptylbenzoate;
4-(2-n-octylthiopyrimidyl)phenyl-4'-n-heptylbenzoate;
4-(2-n-pentylthiopyrimidyl)phenyl-4'-n-octylbenzoate;
4-(2-n-pentylthiopyrimidyl)phenyl-4'-n-octyloxybenzoate;
4-(2-n-octylthiopyrimidyl)phenyl-4'-n-octyloxybenzoate and
4-(2-n-pentylthiopyrimidyl)phenyl-4'-n-decylbenzoate.

15. The smectic cell of claim 11 wherein said liquid-crystal composition further comprises a second phenyl thiopyrimidine type liquid crystal material or a phenyl pyrimidine, biphenyl, biphenyl pyrimidine, terphenyl, or ester type liquid crystal material.

16. The smectic cell of claim 15 wherein said liquid-crystal composition comprises a nematic mixture of ester type, biphenyl type and phenyl pyrimidine type liquid crystal components.

* * * * *